United States Patent [19]

Reunamäki

[11] Patent Number: 5,141,550
[45] Date of Patent: Aug. 25, 1992

[54] POSITIONING DEVICE FOR GLASS BENDING OVEN

[75] Inventor: Pauli T. Reunamäki, Tampere, Finland

[73] Assignee: Glassrobots Oy, Tampere, Finland

[21] Appl. No.: 674,356

[22] PCT Filed: Sep. 27, 1989

[86] PCT No.: PCT/FI89/00182
§ 371 Date: Apr. 12, 1991
§ 102(e) Date: Apr. 12, 1991

[87] PCT Pub. No.: WO90/03335
PCT Pub. Date: Apr. 5, 1990

[30] Foreign Application Priority Data

Sep. 28, 1988 [FI] Finland .................................. 884442

[51] Int. Cl.$^5$ ............................................ C03B 23/025
[52] U.S. Cl. ............................................ 65/273; 65/287
[58] Field of Search .......................... 65/162, 273, 287

[56] References Cited

U.S. PATENT DOCUMENTS 4,528,016  7/1985  Canfield et al. ...................... 65/162
4,881,962 11/1989  Reunamaki et al. ................... 65/273

Primary Examiner—Joye L. Woodard

[57] ABSTRACT

The present invention provides a glass bending device including an oven and a mold within the oven having a number of parallel horizontally extending pipes supported by at least two template plates. A number of parallel horizontally extending heating elements are suspended over the mold and can be raised or lowered by raising or lowering a template which acts on cables attached to the suspended heating elements. The second template causes the overall cross-sectional shape of the suspended heating elements to be the same as or the opposite of the shape of the second template.

4 Claims, 2 Drawing Sheets

POSITIONING DEVICE FOR GLASS BENDING OVEN

BACKGROUND OF THE INVENTION

1. Field of the Invention

The present invention relates to a positioning device for heating elements in a glass bending oven.

2. Prior Art

One of known ways to move heating elements is one by one by manual guidance. Also widely in use is a system in which a frame is used to heat the upper side of the glass and the frame is formed according to final shape of glass. In the frame heating elements can be constructed according to shape of the mold and in the final stage of bending these elements are at the same distance from the glass.

Problems in aforementioned positioning methods included unpredictable results and the inability of these methods to be adjusted for changes in bending shapes and changes of glass sizes. Also, the upper frames constructed individually for each bending shape are clumsy in use and require a lot of storage room and they are unsuitable for use in work where bending shapes are quickly changed.

A positioning device according to the present invention provides a significant improvement over the previously mentioned methods.

SUMMARY OF THE INVENTION

The present invention provides a glass bending device comprising:

an oven a mold within the oven, the mold having a plurality of parallel horizontally extending pipes supported by at least two first template plates;

a plurality of parallel horizontal extending heating elements suspended over the mold; and a positioning device including a second template having an edge shape, a means for raising and lowering the second template, and means for raising and lowering the heating elements which is responsive to the raising and lowering of the second template, the raising and lowering means including at least one cable attached separately to each respective element for moving each respective heating element in a vertical direction, the raising and lowering means for the heating elements including separate means connected to each of the at least one cables for interacting with the second template to cause the plurality of heating elements to be lifted or lowered by the cables to have an overall cross-sectional shape that is the same as or is the opposite of the edge shape of the second template.

A major benefit of device according to the present invention is that the shape of each of the upper heating elements is independent of bending shape of glass. The elements can be made to follow the shape of the mold whether it is convex or concave in basic form, because each of the elements are guided precisely and separately from outside of the bending oven. It should be observed that for each new shape of bending mold, only one thin template plate is needed which can be made at the same time as the template plates which determine the shape of the mold. Also during bending using the device according to the present invention, the shape of the group of elements follows the shape of the glass better, than in prior art devices.

DETAILED DESCRIPTION OF THE INVENTION

Figure 1:
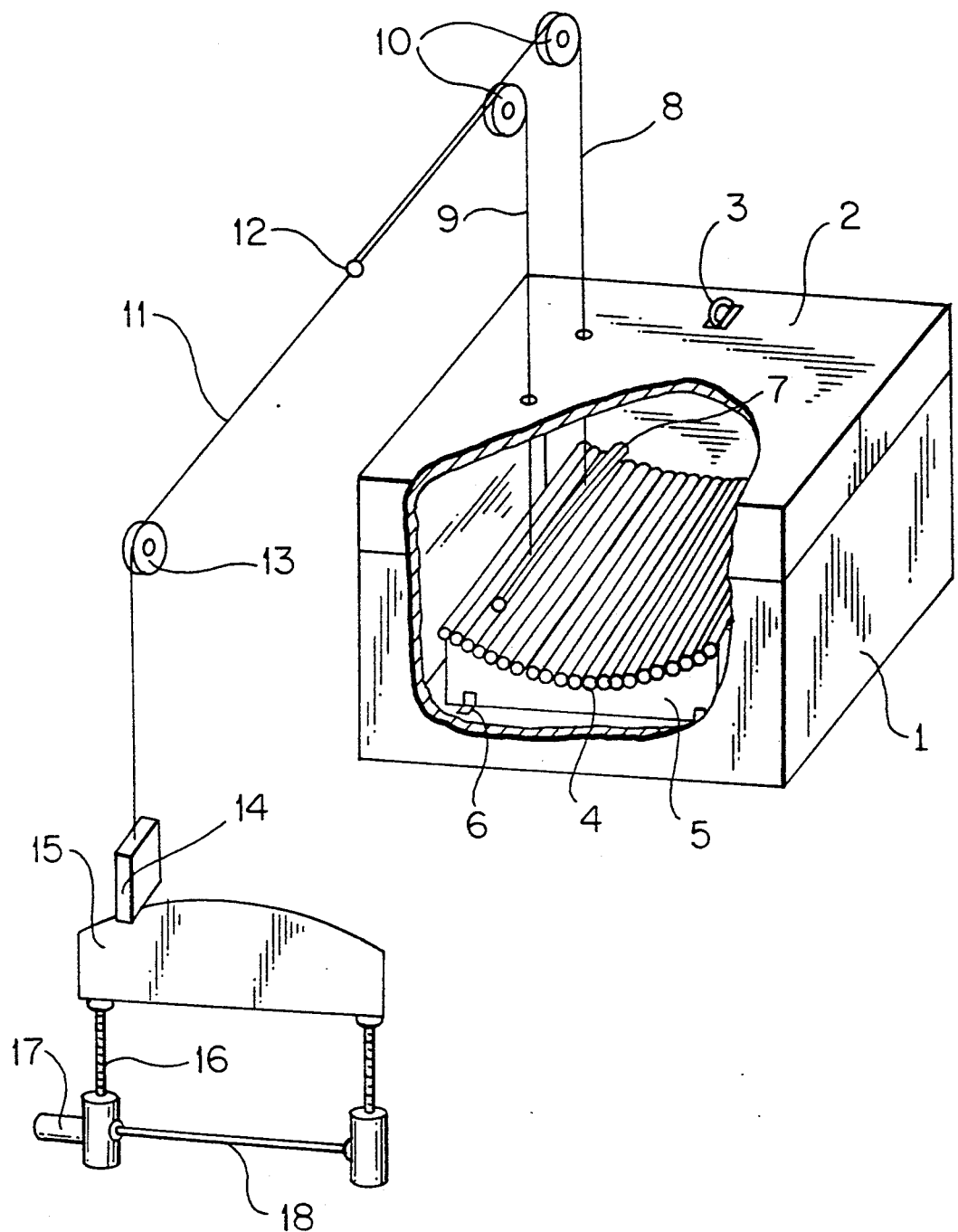
FIG. 1 is a perspective view of a glass bending mold oven according to the present invention, which for simplicity shows only a single heating element in position.

In FIG. 1 there is shown in oven 1 in which there is located a bending mold which consists of fixtures 6 which fix in position fixed template plates 5. On plates there are laid horizontally extending pipes 4 on which glass (not shown) to be bent will be laid. One heating element is hung over the mold with heat resistant ropes or cables 8 and 9. Although only a single heating element 7 is shown, in use the mold would include a number of heating elements, each attached to a separate set of ropes 8 and 9. The ropes 8 and 9 go straight through upper part or cover 2 of the oven. The upper part 2 can be lifted using lift eyes 3 when needed to allow the mold or glass sheet to be changed. Ropes 8 and 9 after going around rolls 10 are joined at a point 12 into one rope 11 which is drawn over a roll 13 by balancing weight 14. Balancing weight 14 is lifted upwards with template plate 15 by a lifting mechanism, which consists of lift screws 16 rotating shaft 18 and rotating motor 17. By controlling lifting of template plate 15 all heating elements 7 can be lowered to simultaneously approach the glass to be bent. Even when there is a problem in lifting template plate 15 or if a rope breaks causing the heating elements 7 to fall on the mold, the lightness of elements 7 prevents them from damaging mold.

Figure 2:
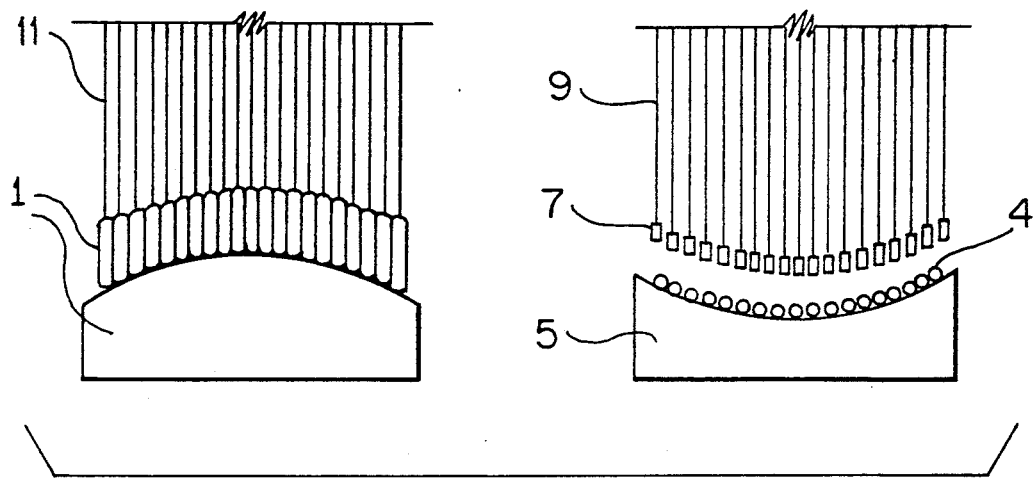
FIG. 2 shows in simplified form a bending mold having all the heating elements and balancing weights positioned.

In FIG. 2 all of the heating elements are shown positioned with help of template plate 15 over pipes 4 of the mold. Elements 7 are kept in position by balancing weights 14 and ropes 11, 8 and 9. Template plate 15 can be made from the same plate as template plate 5 by cutting the template plates apart from each other along the shape line.

It should be especially noted that template plate 15 can be located straight above the oven 1 and/or the balancing weights 14 can be replaced with springs.

Figure 3:
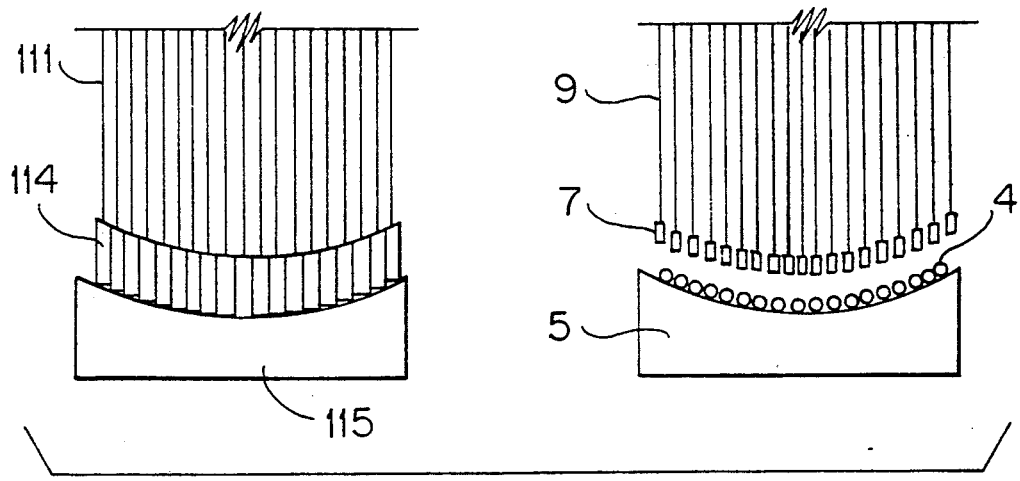
FIG. 3 shows in simplified form another embodiment of the present invention having a concave template.

FIG. 3 shows all of the heating elements positioned with the help of a concave template plate 115 over pipes 4 of the mold. The lengths of each of the ropes are chosen such that when weights 114 rest on template plate 115, the heating elements are properly positioned.

While only one embodiment of the present invention has been described in detail herein, various modifications and changes may be applied without departing from the scope of the invention.

We claim:

1. A glass bending device comprising:
   an oven;
   a mold within said oven, said mold having a plurality of parallel horizontally extending pipes supported by at least two first template plates;
   a plurality of parallel horizontal extending heating elements suspended over said mold; and
   a positioning device including a second template plate having an edge shape, means for raising and lowering said second template plate, and means for raising and lowering said heating elements which is responsive to the raising and lowering of said second template plate, said raising and lowering means for said heating elements including cable means attached separately to each respective element for moving each respective heating element in a vertical direction, said raising and lowering means for said heating elements including separate means connected to each said cable means for interacting with said second template plate to cause said plurality of heating elements to be lifted or lowered by said cable means to have an overall cross-sectional shape that is the same as or is the opposite of the edge shape of said second template plate.

2. A glass bending device according to claim 1, wherein said oven includes a cover and said cables extend through said cover.

3. A glass bending device according to claim 1, wherein said separate means comprises balancing weights.

4. A glass bending device according to claim 3, wherein said balancing weights are supported in a vertical direction by said second template plate for interaction therewith.

* * * * *